United States Patent [19]

Del Rosso

[11] 4,138,008
[45] Feb. 6, 1979

[54] HEAVY DUTY CONVEYOR

[75] Inventor: Victor Del Rosso, Ithaca, N.Y.

[73] Assignee: Hi-Speed Checkweigher Co., Inc., Ithaca, N.Y.

[21] Appl. No.: 790,964

[22] Filed: Apr. 26, 1977

[51] Int. Cl.[2] .............................................. B65G 7/12
[52] U.S. Cl. .................................. 198/365; 198/439; 198/440
[58] Field of Search ............... 198/350, 356, 365, 366, 198/436, 437, 439, 440, 802, 848

[56] References Cited

U.S. PATENT DOCUMENTS

| 3,093,245 | 6/1963 | Worcester et al. | 198/437 |
| 3,277,995 | 10/1966 | Seed | 198/437 |
| 3,366,224 | 1/1968 | Sauvée | 198/802 |
| 3,451,525 | 6/1969 | Greller | 198/365 |
| 3,471,012 | 10/1969 | Calhoun | 198/356 |
| 3,608,698 | 9/1971 | Crall | 198/366 |
| 3,731,782 | 5/1973 | Del Rosso | 198/350 |
| 3,749,225 | 7/1973 | Kennedy | 198/366 |
| 3,762,531 | 10/1973 | Lee | 198/365 |
| 3,786,910 | 1/1974 | Wallis | 198/802 |
| 3,791,518 | 2/1974 | Vanderhoof | 198/440 |
| 3,987,888 | 10/1976 | Wickam | 198/437 |

FOREIGN PATENT DOCUMENTS 971503   7/1975   Canada ................................ 198/365

Primary Examiner—Robert B. Reeves
Assistant Examiner—Richard K. Thomson
Attorney, Agent, or Firm—Bean, Kauffman & Bean

[57] ABSTRACT

A conveyor with laterally deflectable article transporting pallets is disclosed in which the pallets are mounted on a carriage-like structure having wheels which run in and are guided by heavy duty channels.

6 Claims, 5 Drawing Figures

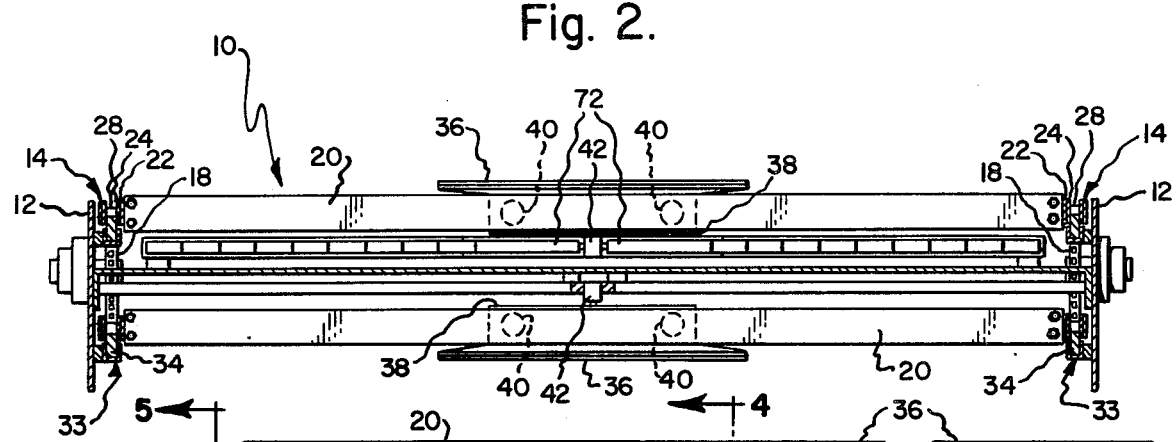
Fig. 2.
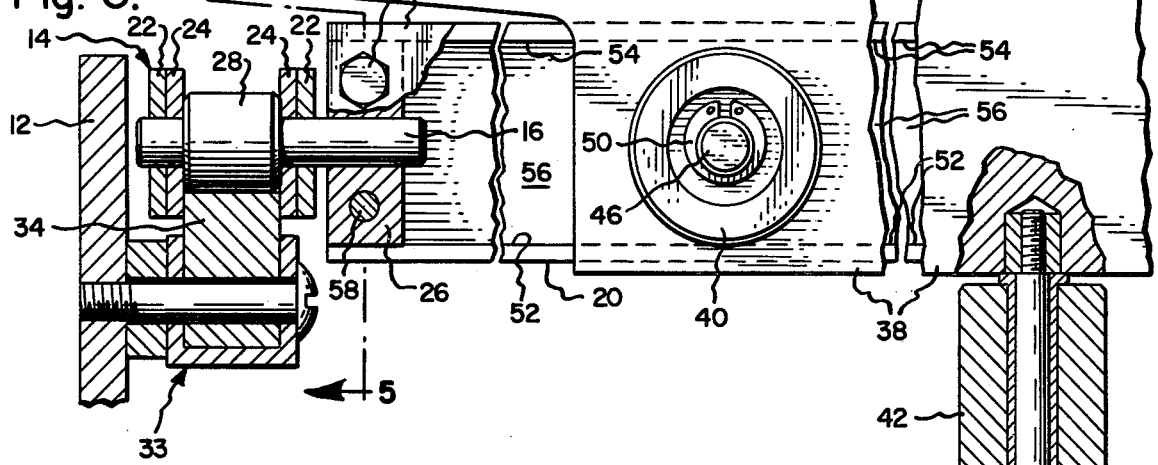
Fig. 3.
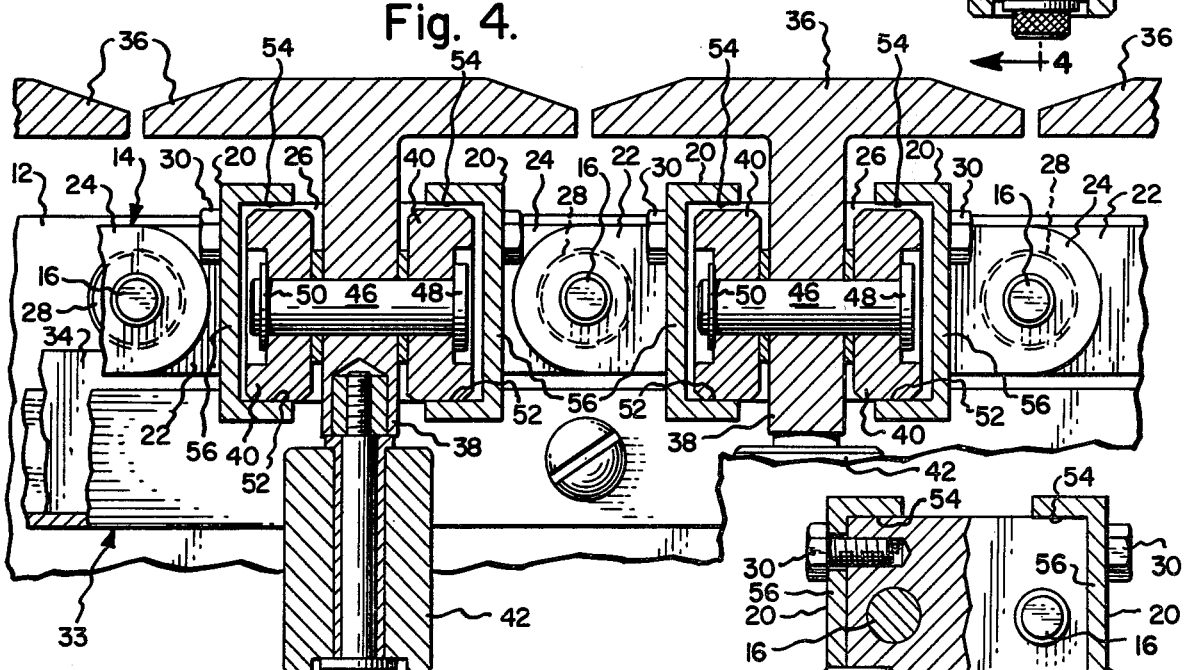
Fig. 4.
Fig. 5.

HEAVY DUTY CONVEYOR

BACKGROUND OF THE INVENTION

1. Field of the Invention

The present invention relates generally to the structure of sorting conveyors. More specifically, the invention relates to an improved structure of conveyors having laterally deflectable article transporting pallets.

2. Description of the Prior Art

The use and design of sorting conveyors of the type consisting of deflectable article carrying sliders mounted on slide rods fixed at each end to an advancing chain is well known. Typical conveyors of this type are disclosed in U.S. Pat. Nos. 3,731,782; 3,500,983; 3,190,432; 3,167,171; 3,129,803; 3,093,245; and 3,009,572. Various advances in the conveyor art have been made which have improved the reliability of these devices and which have enabled the increase of number of articles per minute capable of being handled by the devices. However, one substantial limitation of the prior art devices has remained until the advancement of the present invention.

State-of-the-art conveyors of the type having deflectable article carrying sliders mounted on slide rods are disadvantaged by the fact that they are incapable of operating faultlessly when they are required to convey and sort heavy articles, especially at higher throughputs. It is believed that the major cause of this disability is that the increased weight of the conveyed articles causes the slide rods to bow, thereby making deflection of the sliders along the slide rods more difficult. This difficulty is aggravated by the increase of friction between the slider and the slide rod which results from the increased weight of the conveyed articles and which further impedes the deflection of the slider. Finally, in those conveyors exemplified by U.S. Pat. Nos. 3,731,782 and 3,167,171 in which a magnetic device is utilized to cause switching of magnetically attractable sliders as well as to cause the sliders to follow a given path, the resistance effects of additional momentum of the heavier articles as well as the previously discussed effects of increased friction and slide rod bowing tend to contribute to a condition which frequently exceeds the ability of the magnetic devices to attract and hold the magnetically attractable slider. In this event, either the switching operation is not effectively completed or the slider breaks away from the desired path prematurely so that the sorting conveyor is ineffectual for accomplishing its sorting function.

SUMMARY OF THE INVENTION

Thus is posed the problem of providing a flow deflecting conveyor and especially a magnetically operated flow deflecting conveyor which is not subject to the difficulties of the prior art devices and which is capable of handling articles of increased weight at increased speeds without fault. These and other objects are realized by the present invention through the fact that carriage type articles carrying pallets are provided which are mounted on rollers rather than slideably engaging slide rods as was done in the prior art. The pallet rollers are captured in and roll along the inner surfaces of pairs of mutually facing support channels. The support channels are mounted at either end and are carried by the side roller chains of the conveyor. The support channels, due to their shape and construction, are better able to resist the bending moments placed on them than were the prior art slide rods. Additionally, the design of the present invention substantially reduces the frictional resistances encountered during the lateral deflection of the pallet in comparison to the prior art devices with the elimination of sliding friction by the substitution of dramatically decreased rolling friction.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 2 is an elevation of FIG. 1 taken along line 2—2;

FIG. 3 is a detailed elevation of the structure of one end of the apparatus as shown in FIG. 2;

FIG. 4 is a cross-sectional view taken along the line 4—4 of FIG. 3; and

FIG. 5 is a cross-sectional view of the apparatus taken along the line 5—5 of FIG. 3.

DESCRIPTION OF THE PREFERRED EMBODIMENT

Figure 1:
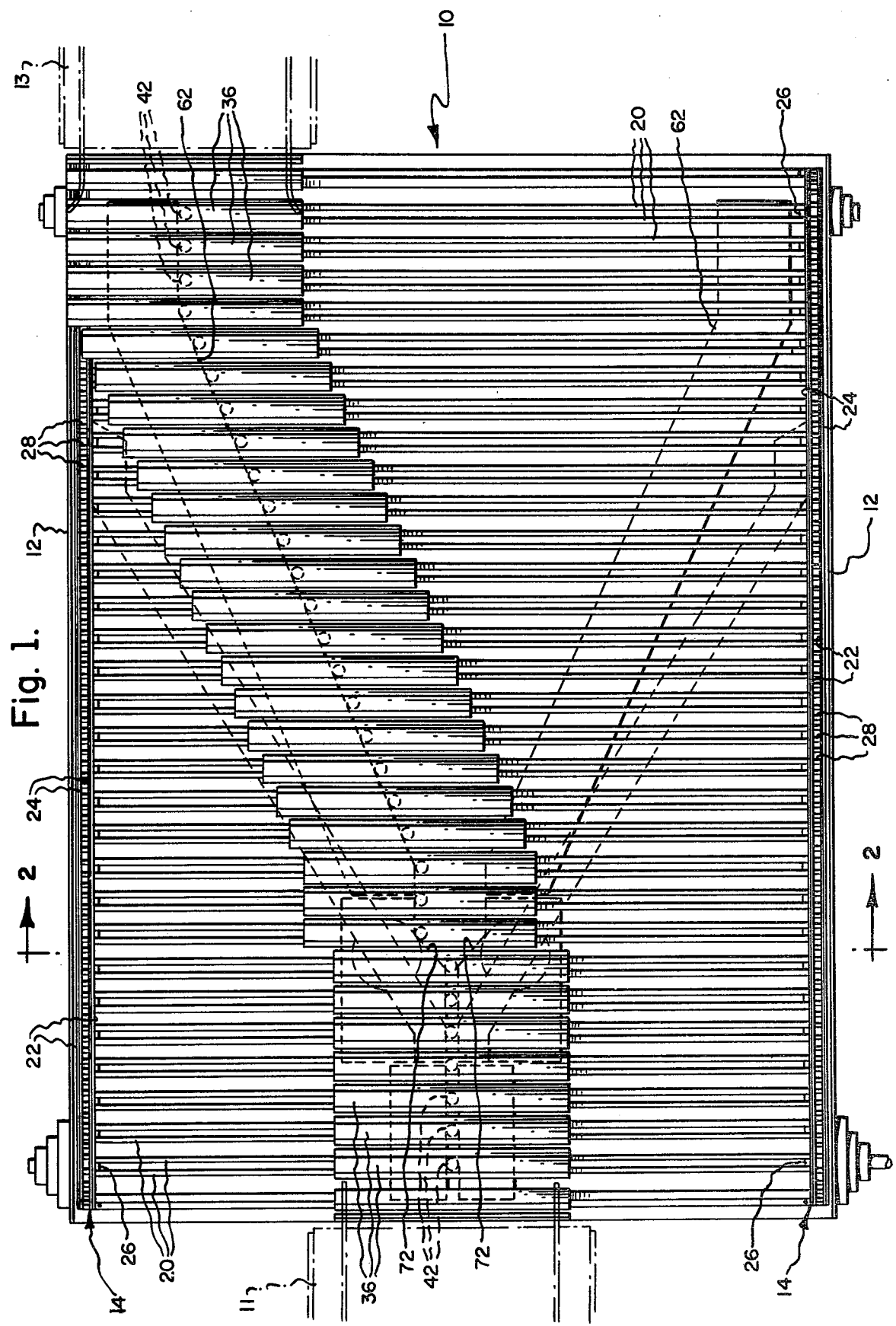
FIG. 1 is a plan view of a magnetic flow director conveyor embodying the present invention.

The present invention relates to an improved design of an endless conveyor which is provided for the purpose of moving an article or articles selectively along one or more predetermined paths in a given direction. Accordingly, the conveyor of the type hereinafter disclosed is useful for sorting articles into two or more discharge lines. This sorting capability may be used in association with a checkweigher with one of the discharge lines carrying away articles having weights falling within a certain allowable range and the other discharge line carrying away articles whose weight falls outside of the allowable range.

A typical conveyor of the type disclosed herein is described in detail in U.S. Pat. No. 3,731,782 entitled MAGNETIC FLOW DEFLECTOR by Victor Del Rosso issued May 8, 1973: the disclosure of which is herein incorporated by reference. Briefly then, the Magnetic Flow Deflector conveyor 10 is disposed between an infeed line 11 and a multiplicity of discharge lines 13 and is operated in a manner that causes the articles to move from infeed line 11 onto the conveyor 10 and subsequently to be separated into one of a multiplicity of lines for eventual discharge to discharge conveyors 13.

The Magnetic Flow Deflector itself consists of a pair of supporting side rails 12 which support roller chains 14 by chain rails 34 and other suitable support structure generally indicated by numeral 33. Spanning the distance between chains 14 are a plurality of transversely mounted laterally extending support members 20. Support members 20 are fixed at either end to roller chains 14 and are carried along with chains 14 as chains 14 are advanced by commonly driven chain sprockets 18. Transversely mounted support members 20 in turn carry article carriers 36 which are each independently mounted for independent movement tranvsversely of the direction of the movement of the drive chains 14 and of the support members 20. As taught by the above cited U.S. patent, pallets 36 are deflected along predetermined paths by means of the interaction of magnetically attractable rollers 42 fixed thereon with magnetic switch means 72 and magnetic guide means 62.

As best shown in FIGS. 3 and 4, the present invention provides an improved design for the transversely mounted support members 20 and for the means for mounting the deflectable pallets 36 on the support members 20. In general, support membes 20 include both an upwardly facing first tread surface 52 and a downwardly facing second tread surface 54 as well as a vertically disposed stiffening member or web 56 connected to each of said first and second tread surfaces. Each pallet 36 has a downwardly extending leg 38 which carries rollers 40 mounted on axle pins 46 with generally horizontally disposed axes of rotation. Rollers 40 engage and receive support from one of said first and second tread surfaces 52 and 54.

In the preferred embodiment whown in FIGS. 3 and 4, the support member 20 consists of a pair of mutually facing channels having cross-sections resembling a squared off C. The lower leg of the C-channel provides the upwardly facing first tread surface 52, and the upper leg of the C-channel provides the downwardly facing second tread surface 54. Connecting these two portions is a vertically extending web means 56 which provides the support member 20 with vertical stiffness. As best seen in FIG. 5, the two mutually facing support channels 20 are linked together and are held separated by a predetermined distance by a rectangular spacer member 26. Channels 20 are fastened to the spacer members 26 by bolts 30 and by positioning pins 58. Each of the spacer members 26 has a pair of holes therethrough for receiving extended chain pins 16 of the roller chain 14. As can be seen in FIG. 3, the roller chains 14 both consist of overlapping links 22 and 24 with each extended chain pin 16 carrying a roller element 28 which engages and rolls along the supporting surface of chain rail 34.

As best seen in FIG. 4, the pallet or article carrier 36 includes a downwardly extending leg 38 which receives therethrough axle member 46 disposed substantially horizontally. Axle pin 46 has a retaining head 48 at one end and at the other end a retaining ring 50 between which are captured a pair of rollers 40 on opposite sides of the downwardly extending leg 38. Rollers 40 are positioned within the mutually facing support C-channels 20 and are sized so that in an upright position the rollers 40 engage and roll along the upwardly facing tread surface 52 without interference with the downwardly facing tread surface 54. It can be readily seen that on the return or lower flight of the conveyor 10 the entire assemblage depicted in FIG. 4 (with the exception of rail 34 and supporting structure 33) is inverted so that rollers 40 engage and roll along tread surfaces 54 which have now become the upwardly facing surfaces.

What is claimed is:

1. An improved endless magnetic flow deflector article conveyor having a horizontal upper flight and a horizontal lower return flight for transporting an article on said horizontal upper flight along a predetermined path in a given horizontal direction, said conveyor being of the type having a plurality of transversely extending article carriers with outwardly facing article carrying support surfaces adjacent to one another in said given horizontal direction, each independently mounted for independent movement transversely of said given direction on one of a plurality of transversely mounted transversely extending support members, said support members mounted for concurrent movement in said given direction along the upper flight in one orientation and along the lower return flight in the opposite direction in an inverted orientation, said conveyor haing a magnetic guide means and a selectively actuable magnetic switch under said upper flight, and each of said article carriers having a downwardly extending magnetically attractable roller with a vertical axis of rotation whose path may be determined by said switch and said guide means, wherein the improvement includes improved support members having generally vertically and laterally extending web means for respectively providing vertical stiffness to said support members and vertically facing tread surfaces, and improved article carriers having a plurality of rollers with horizontal axes of rotation, said rollers adapted to roll along said vertically facing tread surface of one of said support members, whereby the problem of roller breakaway resulting from increased friction caused by heavy articles and by the tendency for heavy articles to deform the elements of said conveyor is reduced to enable more reliable and rapid operation of said conveyor.

2. The improved article conveyor as recited in claim 1 wherein said support members each have a first horizontally disposed and transversely extending tread surface facing in one vertical direction for supporting one of said article carriers and having a second horizontally disposed and transversely extending tread surface facing in a direction opposite to said one vertical direction.

3. The improved article conveyor as recited in claim 2 wherein said support member includes two mutually facing support channels having generally C-shaped cross-sections and wherein said article carrier further includes downwardly extending roller mounting means for mounting pairs of said rollers on opposite sides thereof and between said mutually facing channels wherein each roller of said pair of rollers engages and rolls along the inside upwardly facing surface of one of said channels.

4. The improved article conveyor as recited in claim 2 further being of the type which is an endless conveyor having an upper flight and a lower return flight, wherein said plurality of support means travel in said direction along the upper flight in one orientation and in the opposite direction in an inverted orientation along the lower return flight and wherein said rollers engage said second tread surface while said support members are traveling in said opposite direction along said return flight.

5. The improved article conveyor as recited in claim 4 wherein said support member includes two mutually facing support channels having generally C-shaped cross-sections and wherein said article carrier further includes downwardly extending roller mounting means for mounting pairs of said rollers on opposite sides thereof and between said mutually facing channels wherein each roller of said pair of rollers engages and rolls along the inside upwardly facing surface of one of said channels.

6. The improved article conveyor as recited in claim 1 wherein said improved article carrier is of the magnetic flow deflector type having a magnetic guide and a selectively actuable magnetic switch and wherein each article carrier is provided with a magnetically attractable roller whose path may be determined by said magnetic guide and by said magnetic switch.

* * * * *